United States Patent [19]

Spanier

[11] Patent Number: 4,578,275

[45] Date of Patent: Mar. 25, 1986

[54] DATE PROCESSING

[75] Inventor: Henry C. Spanier, West Milford, N.J.

[73] Assignee: Nabisco Brands, Inc., Parsippany, N.J.

[21] Appl. No.: 544,182

[22] Filed: Oct. 21, 1983

[51] Int. Cl.$^4$ ............................................. A23L 1/212
[52] U.S. Cl. .................................. 426/302; 426/510; 426/639; 426/640; 426/103
[58] Field of Search ............... 426/302, 305, 307, 102, 426/103, 615, 639, 640, 510

[56] References Cited

U.S. PATENT DOCUMENTS

| | | |
|---|---|---|
| 208,744 | 10/1878 | Lane . |
| 534,368 | 2/1895 | Hughes . |
| 1,253,045 | 1/1918 | Katzprowsky . |
| 1,307,691 | 6/1919 | Northrup . |
| 1,374,160 | 4/1921 | Fowler . |
| 1,534,050 | 4/1925 | Barrielle . |
| 1,539,309 | 5/1925 | Goldman . |
| 1,550,321 | 8/1925 | Nichols et al. . |
| 1,631,974 | 6/1927 | McLaughlin . |
| 1,678,046 | 7/1928 | Holmes . |
| 1,853,152 | 4/1932 | Segur et al. . |
| 1,886,931 | 7/1930 | Alexander . |
| 1,980,013 | 8/1932 | Stott . |
| 2,005,184 | 6/1935 | Forrest . |
| 2,066,574 | 6/1933 | Pilorz et al. . |
| 2,072,309 | 5/1935 | Love . |
| 2,128,919 | 9/1938 | Doyle . |
| 2,192,041 | 2/1940 | Headland . |
| 2,209,889 | 7/1940 | Lachman . |
| 2,278,463 | 9/1933 | Musher . |
| 2,411,896 | 12/1946 | Richmond et al. . |
| 2,591,213 | 4/1952 | Stupin et al. . |
| 2,624,676 | 1/1951 | Mako . |
| 2,654,734 | 10/1953 | Skinner . |
| 2,689,182 | 9/1954 | Richert . |
| 2,834,681 | 5/1958 | Kreager . |
| 2,976,159 | 3/1961 | Swisher . |
| 3,052,550 | 9/1962 | Maier . |
| 3,057,739 | 10/1962 | Forkner . |
| 3,086,868 | 4/1963 | Keifer . |
| 3,356,512 | 12/1967 | Lemaire et al. . |
| 3,365,309 | 1/1968 | Pader et al. . |
| 3,368,909 | 2/1968 | Moore . |
| 3,425,848 | 2/1969 | Camirand . |
| 3,510,313 | 5/1970 | Steinkraus et al. . |
| 3,800,049 | 3/1974 | Larroche et al. . |
| 3,931,434 | 1/1976 | Murai . |
| 3,984,580 | 10/1976 | Gur-Arieh et al. . |
| 4,041,184 | 7/1977 | Bonacina . |
| 4,350,711 | 9/1982 | Kahn et al. . |
| 4,361,589 | 11/1982 | Wanters et al. . |
| 4,364,968 | 12/1982 | Waitman et al. . |

OTHER PUBLICATIONS

Stewart, Earl D., "Growing and Packing Dates in California and Arizona", Food Industries, (Sep., 1931), pp. 392 to 395.

DeMan, John M., "Principles of Food Chemistry", The AVI Pub. Co., (1980), pp. 189 to 226.

Rygg, G. L., Date Growers Institute Report, 34, (1957), pp. 12 and 13.

(Abstract continued on next page.)

Primary Examiner—Raymond Jones
Assistant Examiner—Marianne M. Cintins
Attorney, Agent, or Firm—Richard Kornutik

[57] ABSTRACT

Process for treating relatively light colored dates grown domestically to impart thereto the relatively darker appearance, the flavor, the soft-chewy texture and the shelf-stability of imported dates grown in the Middle East region. The process involves applying to the domestic dates a coating of a liquefied composition containing water and an effective amount of at least one saccharide sugar sweetening agent. The saccharide-coated domestic dates are steamed at a temperature and for a period of time which are sufficient to darken the coated domestic dates throughout to substantially the same darkness as that of imported dates. The steamed, coated domestic dates are dried to provide shelf-stable, treated dates. The size and shape of the shelf-stable, treated dates are substantially the same as the size and shape of the starting domestic dates. Domestic dates are generally of the sucrose-type dates, whereas the imported dates are generally of the inverted-sugar type dates.

13 Claims, 1 Drawing Figure

OTHER PUBLICATIONS

Maier, V. P., et al., Date Growers Institute Report, 38, (1961), pp. 6 to 9.

Rygg, G. L., Date Growers Institute Report, 33, (1956), pp. 8 to 11.

Maier, V. P., et al., Date Growers Institute Report, 41, (1964), pp. 8 and 9.

*Encyclopedia of Food Technology*, (1974), pp. 130 to 139, 247 to 253, 280 and 281.

Heath, Henry B., Source Book of Flavors, (1981), pp. 188 and 653.

Cavell, A. J., "Basra Dates, Relationship Between Ripening and Sugar Content of Twelve Varieties", *J.S.C.I.*, 66, (Jun. 1947), pp. 195 to 198 and 286 to 292.

Cook, James A., et al., "Kinds and Relative Amounts of Sugar and Their Relation to Texture in Some American-Grown Date Varieties", Am. Soc. Horti Sci., pp. 286 to 292.

*United States Standards For Grades of Dates*, U.S.D.A., (1955).

Riaz-Ur-Rahman et al., The Punjab Fruit Journal, vol. 19, "Relative Amounts of Sugars and Their Relation to the Flesh Portion in Some Date Varieties of the Punjab", (1955), pp. 26 to 29.

Patterson, Kenneth, "Marketing the Algerian and Tunisian Deglet Noor Dage Crop", pp. 10 and 11.

Fattah, M. T., et al., "Factors Affecting the Composition of Dates", Plant Physiology, vol 2, (1927), pp. 349 to 355.

Maier, V. P., et al., "Studies on Domestic Dates, II, Some Chemical Changes Associated with Deterioration", pp. 322 to 328.

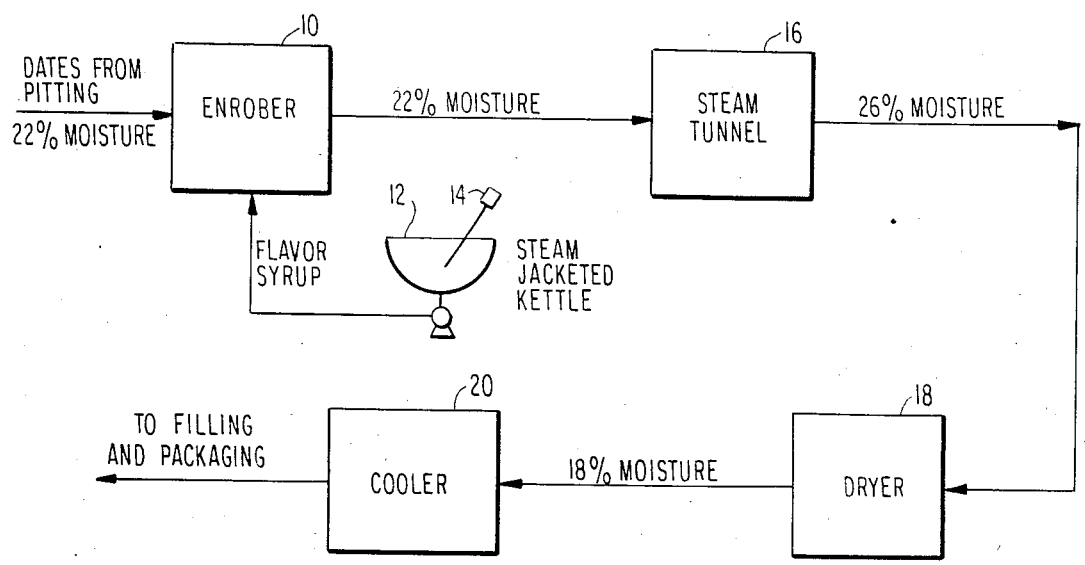

DATE PROCESSING

BACKGROUND OF THE INVENTION

1. Field of the Invention

The invention relates to a process for treating domestically-grown dates to obtain a processed date having the characteristics of Middle Eastern imported dates. The invention also relates to dates treated by the process.

2. Prior Art

Dates are grown on date palms, Phoenix dactylifera L., over a wide expanse of the semitropical middle latitudes of the eastern and western hemispheres. Dates have been used as a staple food for many years. They are of high energy value and are comprised of approximately two-thirds sugar. The date is a sticky one-seeded fruit or berry, usually oblong in shape, which varies much in shape, size, color, quality and consistency of flesh, according to the variety and the conditions of culture. The variety usually grown in California and Arizona is the Deglet Noor, a semisoft fruit with a non-sticky skin. The fruits are light brown in color but darken on storage. The dates grown in the Middle East are darker than the dates grown in the western United States. The commercial product is dehydrated, usually at a low temperature, to retain maximum flavor quality. The dried fruit is over one half sugar by weight (usually 70 to 80 percent) and contains about 2 percent each of protein, fat and mineral matter. Dates contain a high percentage of sugar either as invert or as sucrose, the level of which is maximum just before ripening. In the dry varieties such as Deglet Noor the sugar is mostly sucrose, while the moist varieties contain invert sugar (glucose and fructose).

Maier, V.P., et al., "Studies on Domestic dates, II. Some Chemical Changes Associated with Deterioration", pp. 322–328, reports that sucrose inversion, the result of invertase action, can be prevented by a mild heat treatment.

Imported dates have a darker appearance, different flavor, and a softer, chewier bite than U. S. domestic dates. The domestic dates have a more fibrous, tougher chew and contain more rag than imported dates. Additionally, imported dates are lower in moisture content than domestic dates and can be packaged without drying to obtain a shelf-stable product. Controlled drying is necessary to obtain a shelf-stable domestic date. A desirable characteristic of domestic dates is their uniform size and shape. The shape is retained during packaging whereas imported dates are typically squashed upon packaging into a box. Domestic dates can basically be described as being lighter in color, less sweet, less flavorful (more fruity), and higher in moisture (therefore of borderline shelf stability at room temperature) then imported dates while domestic dates have a fibrous-type of firm texture. They are also more uniform in size and shape than imported dates.

Imported dates contain nearly all invert sugar whereas the domestic dates contain relatively high levels of sucrose with small amounts of invert sugar. Treatment of domestic dates with enzymes to convert the sucrose into invert sugars would be uneconomical.

The nonenzymic browning reactions are heat-induced dehydration, degradation, and condensation reactions which are accompanied with the development of yellow to brown color, and characteristic flavor. Nonenzymatic browning is usually either a caramelization or a Maillard reaction.

The *Encyclopedia Of Food Technology*, The AVI Publishing Co., (1974), at p. 138, reports that at varying water concentrations, the browning reactions are qualitatively different. At relatively high temperatures dehydration of the sugar itself will supply the moisture to accelerate the reaction. At lower temperatures, the air humidity is an important factor. At a given temperature, increasing the water concentration will accelerate browning until, by virtue of dilution of reactants, the rate decreases. The optimum water concentration for browning seems to be about 30 percent. The Encyclopedia, at p. 139, also reports that the processing and storage of susceptible products at the lowest possible temperature aids in preventing browning. Adjustment of the moisture content, either to low moisture in some cases, or to dilute solutions in others, may inhibit browning. At times, lowering the pH of the system may effectively inhibit browning during processing, after which the pH can be readjusted to the desired value.

The natural tannins of dates and the enzymatic and Maillard browning which take place during normal storage impart a brown color and a somewhat caramelized flavor. At 140° F. or so a reddish-brown color as well as astringency and off-flavors occur in Deglet Noor dates. Maier, V.P., Metzler, D.M., and Huber A.M., "Effects of heat processing on the properties of dates", Date Growers Inst. Rept., 41, (1964), 8 to 9. Heat processing coupled with moisture control can be used to improve the color, texture and general quantity of Deglet Noor dates, but again attempts to accelerate the process by use of temperatures in excess of 140° F. may result in the development of off-flavors, off-colors and astringency.

U.S. Pat. No. 3,365,309 (Pader et al.) teaches that fruits should not be subjected to high temperature processing as it substantially destroys or weakens tissue structures.

U.S. Pat. No. 4,364,968 (Waitman et al.) immerses grapes or other fruit into an aqueous solution of a hydrophillic carbohydrate (e.g., fructose, high fructose corn syrup or honey corn syrup) and heats together the grape and carbohydrate solution at 200° F. The heating infuses the carbohydrate into the fruit and melts any surface wax. The excess solution is removed and fruit is dried to a moisture level below 30 percent. Then, if grapes are used, the dried grapes are converted to simulated raisins by storage at a controlled humidity and a high temperature which causes a darkening in color. So the darkening is stated to occur after the drying step has been performed.

Caramelization is generally a relatively high-temperature chemical change in the dates which results in flavor and color changes in the date skin and flesh.

U.S. Pat. No. 2,591,213 teaches that the undesirable caramelization of relatively-dry dates (as indicated by the redness in the fleshy part of the date) occurs when the dates are subjected to water vapor at a temperature of 150° F. or higher.

Deglet Noor dates are usually light brown in color. Maier et al., ibid., (1964) 8, reports that dark brown dates are considered to be undesirable. Page 9 of Maier et al. reports that tough dates have invert sugar contents of 25 to 35 percent (dry weight basis), whereas tender dates have invert sugar contents above that.

In U.S. Pat. No. 4,350,711 (Kahn et al.) sugar solutions are infused into fruits such as dates to increase their stability. Such process results in a glaceed fruit such as the fruits used in the production of fruit cakes.

BROAD DESCRIPTION OF THE INVENTION

An object of the invention is to provide a process for treating domestically-grown dates to impart to them the darker appearance, the flavor, the soft, chewy texture and the shelf-stability of dates grown in the Middle Eastern regions while retaining the size and shape of domestic dates. Another object is to provide treated domestic dates which have the darker appearance, the flavor, the soft, chewy texture and the shelf-stability of Middle East dates and have retained the size and shape of domestic dates. Other objects and advantages of the invention are set out herein or obvious herefrom to one ordinarily skilled in the art.

The objects and advantages of the invention are achieved by the processes of the invention.

The invention involves a process for treating relatively-light colored, sucrose-type dates grown domestically to impart thereto the relatively darker appearance, the flavor, the soft-chewy texture and the shelf-stability of imported invert sugar-type dates grown in the Middle East region. The process includes applying to the domestic dates a coating of a liquefied composition containing water and an effective amount of at least one saccharide sugar sweetening agent. The coated domestic dates are steamed at a temperature and for a period of time which are sufficient to darken the coated domestic dates throughout to substantially the same darkness as that of imported dates. The steamed, coated domestic dates are dried to provide shelf-stable, treated dates. The size and shape of the shelf-stable, treated dates are substantially the same as the size and shape of the starting domestic dates. The off-flavors and astringency which occur in sucrose-type of dates, such as, the Deglet Noor variety, at 140° F. or so are avoided or eliminated by the invention process. The domestic dates treated by the invention process do not have any astringency or off-flavors. The key to overcoming the prior art problems and disadvantages is the use of an aqueous sugar coating in conjunction with steaming of the dates. This, plus subsequent drying, imparts the desired properties and excellent shelf life. Apparently the additional sugar infused into the dates by the steam allows some invert sugar to be formed (or added), prevents the formation of undesirable off-flavors and the like, allows controlled browning to occur and allows the formation of a soft, chewy texture. The additional sugar by infusion and on the surface apparently prevents shrinkage, distortion or expansion from the original size of the dates. A combination of sucrose and honey provides the best results.

The invention process improves and/or alters the flavor, texture, color and stability of domestic dates, and allows the use of domestic dates in place of imported dates. The invention process has several steps, each of which are integral in favorably improving and/or alter the flavor, texture, color and/or stability of the domestic dates. The distinct product identity of imported dates is their darker appearance (color). The invention method darkens the appearance of the domestic date not only on the surface but throughout the date. Another key distinction between domestic and imported dates is their texture. The softer, pliable texture achieved by the invention process in domestic dates closely resembles the texture of imported dates.

The sugar coating is preferably applied to the domestic dates by spray coating liquefied composition (a) onto the domestic dates, and preferably liquefied composition (a) is hot when it is sprayed. The preferred domestic dates are of the Deglet Noor variety. Preferably liquefied composition (a) has 60 to 95 weight percent of the at least one saccharide sugar sweetening agent, and preferably is composed of water and 65 to 85 weight percent of sucrose. The most preferred liquefied composition (a) contains a combination of sucrose and honey. Advantageously liquefied composition (a) is (i) an aqueous solution of sucrose, (ii) an aqueous solution of fructose, (iii) an aqueous solution of lactose, (iv) an aqueous solution of dextrose, (v) an aqueous solution of invert sugar, (vi) maple sugar, (vii) molasses, (viii) an aqueous solution of brown sugar, (ix) honey, (x) an aqueous solution of corn syrup, and (xi) mixtures of materials (i) to (x). If an aqueous solution of corn syrup is used, it preferably is an aqueous solution of high fructose corn syrup. Liquefied composition (a) also advantageously contains 1 to 10 weight percent of at least one flavoring agent, which preferably is a natural brown sugar flavoring agent. Preferably steaming step (b) is conducted by using steam of atmospheric pressure. Drying step (c) is preferably conducted by using a temperature of 235° to 245° F.

Broadly the sugar concentration should be from 60 to 95 weight percent of the aqueous solution or syrup. The amount of sugar coated on the dates should be 2.5 to 5.0 weight percent based on the weight of the dates before the sugar coating is applied.

The flavor becomes more carmel-like; the darker color is more acceptable by consumers than the pale yellow brown color of domestic dates; and the texture becomes softer and more chewy. The treated domestic dates do not have any loss in aroma or taste. The treated dates do not have any disagreeable odors or off-flavors. The treated dates have a well-developed date taste and flavor.

One possible theory of at least part of the mechanism of the invention is that part of the applied sugar infuses into the interior of the dates (and possibly into some of the cells of the dates). The steaming, heat and sugar then act on and in the dates as stated above. The infused sugar may also maintain cell wall integrity (prevent cell wall collapse) during drying so that the dried, treated dates retain the size and shape of the original dates.

In the process of the invention the domestic dates are sprayed with a flavoring sugar solution, steamed and dried to obtain a processed date having the darker color, the flavor, the soft, chewy texture, and the shelf-stability of imported dates while retaining the uniform size and shape of the domestic date. The darkening of the domestic date is a function of the temperature, moisture content of the atmosphere and time of processing. Steam treatment is preferred over dry heat treatment. The latter is less economical because longer processing times are needed to obtain a dark appearance. The dry heat treatment is not as effective as it tends to dehydrate the dates which does not provide the optimum conditions to prevent off-flavors, etc., and to provide sufficient sugar infusion, controlled sugar inversion, and controlled browning.

The invention also involves shelf-stable dates which are composed of dried, domestically-grown, sugar-type dates treated so as to have the relatively darker appearance, the flavor, the soft-chewy texture and the shelf-stability of invert sugar-type dates grown in the Middle East region. The treated-domestic dates have at least one steam-treated saccharide sugar sweetening agent on the surface of the dates and in the internal regions near the surface of the treated-domestic dates. The treated-domestic dates retain substantially the size and shape of untreated domestic dates.

Preferably the domestic dates are of the Deglet Noor variety. The saccharide sugar sweetening agent most preferably is a combination of sucrose and honey. Advantageously the saccharide sugar sweetening agent is (i) sucrose, (ii) fructose, (iii) lactose, (iv) dextrose, (v) invert sugar, (vi) the at least one saccharide sugar sweetening agent in maple syrup, (vii) the at least one saccharide sugar sweetening agent in molasses, (viii) the at least one saccharide sugar sweetening agent in brown sugar, (ix) the at least one saccharide sugar sweetening agent in honey, (x) the at least one saccharide sugar sweetening agent in corn syrup, and (xi) mixtures of materials (i) to (x). If a corn syrup is used, it preferably is a high fructose corn syrup. Advantageously 1 to 10 weight percent of at least one flavoring agent, preferably date flavoring agent, is present with the steam-treated saccharide sweetening agent.

More broadly, the invention involves shelf-stable dates which comprise dried, domestically-grown dates treated so as to have the relatively darker appearance, the flavor, the soft-chewy texture and the shelf-stability of dates grown in the semi-tropical regions of the Eastern Hemisphere. The treated domestically-grown dates retain substantially the size and shape of untreated domestically-grown dates. Preferably the domestic dates are of the Deglet Noor variety.

The invention dates are stable against spoilage by microorganisms and by enzymatic action. The invention dates do not have to be stored at temperatures below room temperature, but of course cold storage increases their shelf life. The invention dates in air-tight package form are shelf stable for as long as 1 to 2 years at room temperature.

The dried, treated dates of the invention can be used in foodstuffs, such as, date nut bread, cakes (including mixes), pies, icings, cookies (including mixes), fruit cakes, puddings, yogurts, donuts, ice creams, pancake batters, cream-type products, pie and donut fillings, flour-based batters, non-dairy creamers, pie-crusts, corn flakes, bran flakes, rice cereal, and other baked goods, breakfast cereals and confectionary goods.

Textural modification is basically the result that accompanies the invention process's stability, flavor and color development in domestic dates. The textural modification takes the form of the development of a softer, pliable, less fibrous bite in domestic dates. This is a desirable feature found in imported dates.

BRIEF DESCRIPTION OF THE DRAWING

In the drawing:
The FIGURE is a flow diagram of an embodiment of the process of the invention.

DETAILED DESCRIPTION OF THE INVENTION

As used herein, all parts, percentages, ratios and proportions are on a weight basis unless otherwise stated herein or otherwise obvious herefrom to one ordinarily skilled in the art.

The domestic dates treated by the invention are generally termed sucrose-type dates because such date varieties contain sucrose is the principal sugar. The preferred variety of domestic date is Deglet Noor, but other suitable varieties of domestic dates include Kirta, Thuuri and Deglet Beidha. The imported Middle East dates are generally characterized by having invert sugar as the principal sugar.

The domestic dates generally are light colored and translucent. The imported dates generally are considerably darker. Usually the darker color has been avoided in domestic dates because of lack of consumer appeal. The invention affects the color of the domestic heat by steam treatment to provide a darker appearance. The sugar coating, steaming and subsequent drying provide the flavor of the imported dates without any off-flavors, etc.

During the ripening of dates there appears to be a conversion of sucrose to invert sugars. The growing season is several weeks shorter in the United States than in the Middle East. It is believed that this is the reason why domestically grown dates have a high sucrose content, as is the case with domestically-grown dates of the Deglet Noor variety. During the maturing or ripening process the flesh around the date seed is hydrolyzed to sugars and part of the sucrose present is hydrolyzed to invert sugar. Enzymatic conversion of the sucrose would not be economical.

Soft date varieties grown in the United States apparently contain little or no sucrose, whereas the semi-dry varieties grown domestically contain significant to very high levels of sucrose. Typical semi-dry varieties grown domestically are Dayri, Deglet Noor, Troma and Zahidi. Generally, varieties that are high in sucrose are firm whereas varieties with relatively large amounts of invert sugar are soft. The invention process imparts a soft texture to the domestic dates, which normally have a fibrous tough chew.

Imported dates are shelf stable, but the domestic dates are not shelf stable due to a high moisture content and other factors. The controlled drying of the U.S. dates helps provide more shelf stability.

The invention process imparts the color, flavor, texture and shelf-stability characteristics of imported dates to domestic dates while retaining the favorable characteristic of uniform size and shape of the domestic date. The invention dates are soft but do not squish when pressed between the fingers.

The saccharide sugar sweetening agent can be one or more monosaccharide sugar sweetening agent, disaccharide sugar sweetening agent or higher saccharide sugar sweetening agent. Preferably a disaccharide sugar sweetening agent is used. The sugars used are usually cane-, beet- or corn-derived. Preferably aqueous solution of sugar has at least 60 weight percent of sugar.

A preferred sugar is sucrose, which is a disaccharide sugar obtained from sugar cane and sugar beets. The sucrose is preferably used in the form of a "liquid sugar" which is a solution or syrup of 23 to 33.3 percent water with the remainder sucrose. The most preferred sucrose solution contains 75 percent sucrose and 25 percent water. The solubility of sucrose in water at 25° C. is about 206 grams of sucrose per 100 grams of water. The use of only sucrose results in a crystalline formation in the dates which is an undesirable result. Accordingly, the most preferred saccharide sweetening agent is a combination of sucrose and honey, best with a weight ratio of sucrose to honey between 20:1 to 40:1. Too much honey results in a date system which will not dry and will stay sticky. The sucrose-honey combination provides domestic dates with the texture, taste, stability, etc., of imported dates.

Other types of "liquid sugars" or sugar solutions are invert liquid sugars, liquid brown sugars and molasses. Molasses is the concentrated juice extracted from sugar-bearing plants.

Invert sugar is a mixture of fructose and glucose usually obtained from the hydrolysis (inversion) of sucrose. Particularly preferred are combinations of sucrose and invert sugar syrups (honey) of at least 65 to 75 weight percent concentration. Invert sugar is more soluble than sucrose, so it can be formed into syrups of higher concentration than sucrose. Sucrose and invert sugar can both be used with little advantage of one over the other. The heating in the invention process results in some of the sucrose being converted to invert sugar.

Other sweeteners that can be used are corn syrups, such as, high fructose corn syrup, acid converted corn syrup, high maltose corn syrup and enzyme-enzyme converted corn syrup, aqueous solutions of dextrose, aqueous solutions of lactose, aqueous solutions of fructose, honey, such as, floral honey and honeydew, maple syrup, aqueous solutions of maltose, aqueous solutions of isomaltose, and aqueous solutions of high saccharides (e.g., Isosweet, CPC Corp.). Corn or glucose syrup is the purified, concentrated solution of nutritive saccharides obtained from edible starch. Dextrose is also termed corn sugar. Lactose, at 25° C., has a final solubility of 21.6 g per 100 g of water and a supersolubility of 50 g per 100 g of water—accordingly, lactose is not preferred because of its relatively low water solubility.

Mixtures of the nutritive sweeteners can be used. Mixtures of sucrose and honey or sucrose and corn syrup are quite advantageous. Crystallizing sugars, such as, sucrose, and non-crystallizing sugars, such as, corn syrup, are operable in the invention.

The sugar content of corn syrup, honey, molasses and the like can be increased by adding sucrose, fructose, etc.

While the polyols (alcohol sugars) such as xylitol are sweeteners, they should not be used as they do not undergo Maillard browning and caramelization like other sugar substitutes, such as, fructose and dextrose. The invention also does not use a browning retardant such as a sulfite salt.

The Maillard reaction or nonenzymatic browning is a complex of reactions involving the sugar and protein that occurs from limited heating. Apparently the most significant reactions involve amines (protein and amino acids) interacting with sugars to produce brown, polymeric pigments, and low-molecular-weight ultraviolet absorbing compounds including various flavor and aroma constituents. The browning reaction is known to be affected by temperature, pH, moisture level and other factors. It is also known that foods rich in reducing sugars are very subject to the brown reaction - sucrose is not a reducing sugar. It is further known that the browning reaction rate is generally high in foods having a low water content.

Increased temperature, particularly at high sugar concentrations, generally rapidly increase the rate of browning.

In general, the browning reaction is known to be slowed down by increasing pH. The effect of pH on the browning reaction is known to be highly dependent on moisture content. It is known that when a large amount of water is present, most of the browning is caused by caramelization, but at low water levels and at pH greater than 6, the Maillard reaction is predominant. In conjunction with the invention process, studies of the effect of pH on color development were conducted to see if either acidifying of alkalining the domestic dates accelerated the color development time (at conditions of subjection to forced air heating at 200° F. in a closed receptacle). Acidification caused very limited color change and alkaline treatment did not accelerate the reaction time. Accordingly, the color reaction of domestic dates resulting from subjection to forced air heatine does not appear to be pH dependent.

The invention process uses the non-enzymic browning of dates to advantage. Nonreducing disaccharides, such as, sucrose, only react in the non-enzymatic browning reaction after hydrolysis of them has taken place. In this manner it is easier to control the color change by the use of sucrose.

Caramelization is generally a relatively high temperature chemical phenomena in the dates which causes changes in the flavor and color of the date skin and flesh. The steaming of a concentrated sugar-water coating in the invention prevents or compensates for any undesirable flavor changes in the date due to any caramelization. The adding of a date flavoring agent also helps to mask any undesirable flavor changes in the dates due to any caramelization. A darker date appearance is sought by the invention.

The formation of the caramel pigment can be considered as a non-enzymatic browning reaction in the absence of nitrogenous compounds. When sugars are heated in concentrated solution, a series of reactions occurs which finally leads to caramel formation. It is known that the caramelization of sucrose requires a temperature of about 200° C. At 160° C. sucrose melts and forms glucose and fructose anhydride. At 200° C. the reaction sequence consists of three distinct stages well separated in time. Accordingly it is believed that caramelization at most plays a minor role in the invention process.

Preferably a natural flavoring agent is included in the sugar solution, and the preferred natural flavoring agent is a natural date extract. Other flavoring agents, such as, vanilla extract, brown sugar, caramel and butterscotch flavors, can be used. Preferably the flavoring agent composes about 6 weight percent of the sugar solution, but typically the flavoring agent or agents can be used in an amount composing 1 to 10 weight percent of the sugar solution.

A coloring agent in the amount of 1 to 5 weight percent of the sugar solution can be used but such is not a preferred feature of the invention.

The most preferred sugar solution contains about 75 weight percent of sucrose (cane sugar), about 3 weight percent of honey, about 6 weight percent of natural brown sugar flavor and about 21 weight percent of water.

Any suitable application method can be used to apply the sugar solution to the dates, but preferably the sugar solution is sprayed onto the dates. Spraying has the advantage of minimizing the amount of sugar solution which must be used. Preferably the sugar solution is hot (e.g., 75° C. to boiling) when it is sprayed. Other suitable application methods include immersing or dipping the dates in the hot sugar solution. The steaming introduces some of the sugar into the interior to the dates.

The treated dates are preferably dried in a forced air oven at a temperature of 220° to 260° F., preferably at 240° F., for a period of 30 minutes to 1 hour, preferably about 45 minutes. The hot air preferably has a low moisture content. The treated dates can be dried in any suitable manner, such as, sun drying, freeze-drying, vacuum drying, dielectric oven conditioning, air drying, air-oven drying, etc. Preferably the dates are dried to a moisture content below 23 percent so that a preservative does not have to be used. Normally the dates are dried to a moisture content of about 18 to 22 percent if they are to be sold for consumption as such. Moisture levels as low as 6 to 10 percent are achieved if the dates are to be used in breakfast foods, such as, cereal products, specifically corn flakes.

A shelf stable converted date is achieved when the water activity is lower than 0.68—this state or condition has been accomplished with the dates processed by the method of the invention. Water activity is broadly defined as the ratio of the moisture content of the product (date) to the relative humidity of the air surrounding it. The relative humidity corresponding to each specific moisture content of the product (date) is called equilibrium relative humidity. The following relationship more specifically defining water activity applies:

$$a = p/p° = ERH/100$$

wherein:
a = water activity
p = partial pressure of water in the food (date)
p° = vapor pressure of water at same temperature
ERH = equilibrium relative humidity in percent A water activity of 0.68 or less is necessary to achieve a shelf stable date product. Domestic dates, as received from the supplies, are usually higher than such value. The invention procedure reduces the water activity level to less than 0.68.

The dried dates are packaged for consumption as such or used in preparing a food stuff.

By way of summary, the invention involves a process which includes spraying domestic dates with a hot, flavored, sugar solution or syrup to coat them, steaming the coated dates atmospherically to obtain a shelf-stable processed date having the color, flavor, texture and shelf-stability characteristics of imported dates while retaining the uniform size and shape of the domestic date. A primary feature of the process is the treating of the date with a sugar solution prior to steaming.

EXAMPLE 1

Domestic dates (of the Deglet Noor variety) were sprayed with the sugar solution or syrup. The sugar solution comprised approximately 75 weight percent of sugar, 21 weight percent of water, 3 weight percent of honey and 6 weight percent of natural brown sugar flavoring, each based upon the total weight of the sugar solution. The sugar solution is heated to boiling and sprayed hot onto the dates to coat them. Heating the solution reduced its viscosity which facilitated spraying. The coated dates were then placed in an autoclave and steamed at atmospheric pressure for about one hour. (The steaming can be accomplished using shorter processing times, e.g., about 15 minutes. However, it is preferable to conduct the spraying of the sugar solution and the atmospheric steaming on a conveyor because less material handling is required.) The steamed product was dried in a forced air oven at a temperature of about 240° F. for 45 minutes to obtain a shelf-stable processed date. The hot air had a low moisture content. The dried domestic dates had the color, appearance, texture and flavor of imported dates and retained their original shape and size. The dried dates were placed in moisture proof bags and stored at room temperature. This example illustrates the invention process.

EXAMPLE 2

The invention process for converting domestic dates at a rate of 2700 lbs. of dates per hour is illustrated in the FIG. Domestic dates (of the Deglet Noor variety) were pitted and pasteurized. The moisture content of the dates was about 22 percent. The dates were enrobed with a sugar syrup in enrober 10. The sugar syrup was made up in steam jacketed kettle 12 having agitator 14. Sugar syrup had a solids content of about 6.5 percent. Sugar flavor and water were heated to a boil and then kept at 190° to 200° F. in order to prepare the sugar syrup. The moisture content of the dates after enrobing did not change from the level of about 22 percent. The flavored dates were steamed in steam tunnel 16 for 1 hour at a steam temperature of 240° to 250° F. The moisture content of the dates after steaming was 26 percent. The steamed dates were dried in forced air dryer 18 to a moisture content of about 18 to 19 percent. The drying air was at 240° to 250° F. and the drying time was about 45 minutes. The dried dates were cooled in cooler 20 such that the temperature of the center of the dates was about 80° F. The cooled dates were then filled and packaged in containers.

EXAMPLE 3

This example illustrates the process of the invention.

A sugar syrup (300 grams total) of 210 grams of fine grain sugar, 75 grams of water, 9 grams of pure honey (Grade B) and 6 grams of brown sugar flavor was prepared and heated to a boil (about 190° to 200° F.). 500 grams of domestic dates (21.8 percent water) were put into a tumbler and tumbled. The tumbling dates were sprayed with 25 grams of the sugar syrup using an air spray gun (60 psi air pressure). The sprayed dates had a moisture content of 21 percent. The sprayed dates were steamed in boxes for 1 hour (retort). The steamed dates had a moisture content of 25.8 percent. The steamed dates were dried in open boxes in a forced air oven at 240° F. After 30 minutes of drying, the dates had an equilibrium relative humidity (ERH) of 67.5 percent and a water content of 19.24 percent. After 45 minutes of drying, the dates had an ERH of 66.3 percent and a moisture content of 17.73 percent. The 45 minute drying period provides the best balance of water activity and economics. After 60 minutes of drying, the dates had an ERH of 62.0 percent. The dates were cooled on screens to room temperature.

The invention-treated (converted) domestic dates had a nice appearance, were sweet and had a flavor that was somewhat pruny with a touch of honey. The invention-treated domestic dates were more intact and less deteriorated looking than domestic dates that have been soaked in sugar solutions (e.g., honey, high fructose corn syrup, etc.). Domestic dates were flavored and sweetened to resemble imported dates by spraying the domestic dates wherby merely the surface of the domestic dates was coated.

EXAMPLE 4

This example illustrates the process of the invention.

A sugar syrup (300 grams total) of 210 grams of fine grain sugar, 63 grams of water, 9 grams of pure honey (Grade B) and 18 grams of brown sugar flavor was prepared and heated to a boil (about 190° to 200° F.). 500 grams of domestic dates (21.8 percent water) were put into a tumbler and tumbled. The tumbling dates were sprayed with 35 grams of the sugar syrup using an air spray gun (60 psi air pressure). The sprayed dates had a moisture content of 21 percent. The sprayed dates were steamed in boxes for 1 hour (retort). The steamed dates had a moisture content of 25.8 percent. The steamed dates were dried in open boxes in a forced-air oven at 240° F. After 30 minutes of drying, the dates had an equilibrium relative humidity (ERH) of 67.5 percent and a water content of 19.29 percent. After 45 minutes of drying, the dates had an ERH of 64.6 percent and a moisture content of 17.73 percent. The 45 minute drying period provides the best balance of water activity and economics. The dates were cooled on screens to room temperature.

The invention-treated (converted) domestic dates had a nice appearance, were sweet and had a flavor that was somewhat pruny with a touch of honey. Also, the invention-treated domestic dates were sticky, yet easy to handle and chop. The invention-treated domestic dates were more intact and less deteriorated looking than domestic dates that have been soaked in sugar solutions (e.g., honey, high fructose corn syrup, etc.). Domestic dates were flavored and sweetened to resemble imported dates by spraying the domestic dates whereby merely the surface of the domestic dates was coated.

EXAMPLE 5

Twenty four taste test panelists were asked to evaluate dates in appearance, flavor, texture and overall categories. Each panelist was given a date processed (converted) as in Example 4 and an imported date. The testing was done using a blind date format. There was no significant preference by the test panel for either the invention-treated dates or the imported dates in the appearance, flavor, texture and overall categories. The panel repeated the test ten times. The invention-treated domestic dates were well received by the test panel.

EXAMPLE 6

Domestic dates processed (converted) as in Example 5 were prepared in a date bran muffin recipe. Imported dates were also prepared in a date bran muffin recipe. Twenty four taste test panelists were given written instructions that they were to evaluate the effect of the dates in the date bran muffin in a blind test. Each panelist was given a date bran muffin having the converted domestic dates and a date bran muffin having the imported dates. There was no significant preference by the test panel for either the date bran muffins containing the converted domestic dates or the date bran muffins containing the imported dates in the appearance, flavor, texture and overall categories. The panel twice repeated the test. The invention-treated domestic dates were well received by the taste panel when prepared in a date bran muffin recipe.

EXAMPLE 7

Domestic dates processed (converted) as in Example 5 were prepared in a date nut bar recipe. Imported dates were also prepared in a date nut bar recipe. Twenty four taste test panelists were given written instructions that they were to evaluate the effect of the dates in the date nut bars in a blind taste. Each panelist was given a date nut bar having the converted domestic dates and a date nut bar having the imported dates. There was no significant preference by the test panel for either the date nut bar containing the converted domestic dates or the date nut bars containing the imported dates in the appearance, flavor, texture and overall categories. The panel twice repeated the test. The invention-treated domestic dates were well received by the taste panel when prepared in a date nut bar recipe.

EXAMPLE 8

A sugar syrup (300 grams total) of 210 grams of fine grain sugar, 60.0 grams of water, 12 grams of honey (Grade B), 15 grams of brown sugar flavor and 3.0 grams of butterscotch flavor was prepared and heated to a boil (about 190° to 200° F.). 500 grams of domestic dates were put into a tumbler and tumbled. The tumbling dates were sprayed with 30 grams of the sugar syrup using an air spray gun (60 psi air pressure). The dates (positioned 19 per plate) were microwaved for 3 minutes. The sprayed dates were steamed in boxes for 1 hour. The dates were cooled on screens to room temperature.

The treated dates had a flavor which was good and sweet with a very slight note of prune, and had a texture which was somewhat gritty. The treated dates were harder and drier than the invention-treated dates of Example 4. This example shows the effects of microwaving the sugar-coated dates after spraying and prior to steaming, along with microwave drying instead of forced air drying.

EXAMPLE 9

A sugar syrup (300 grams total) of 210 grams of fine grain sugar, 60.0 grams of water, 12 grams of honey (Grade B), 15 grams of brown sugar flavor and 3.0 grams of butterscotch flavor was prepared and heated to a boil (about 190° to 200° F.). 500 grams of domestic dates were put into a tumbler and tumbled. The tumbling dates were sprayed with 30 grams of the sugar syrup using an air spray gun (60 psi air pressure). The dates (positioned 19 per plate) were microwaved for 2 ½ minutes. The sprayed dated were steamed in boxes for 1 hour. The steamed dates on plates were dried by microwaving for 2 minutes. The dates were cooled on screens to room temperature. The dates had a moisture content of 17.16 percent and an ERH of 64.6 percent.

The treated dates had a flavor which was pruny and slightly sweet, had a texture which was good, soft and moist. The treated dates were less moist than the invention-treated dates of Example 4. This example shows the effects of microwaving the sugar-coated dates after spraying and prior to steaming, along with microwave drying instead of forced air drying.

EXAMPLE 10

A sugar syrup (300 grams total) of 210 grams of fine grain sugar, 60.0 grams of water, 12 grams of honey (Grade B), 15 grams of brown sugar flavor and 3.0 grams of butterscotch flavor was prepared and heated to a boil (about 190° to 200° F.). 500 grams of domestic dates were put into a tumbler and tumbled. The tumbling dates were sprayed with 30 grams of the sugar syrup using an air spray gum (60 psi air pressure). The sprayed dates were steamed in boxes for 1 hour. The steamed dates on plates were dried by microwaving for 2 1/1 minutes. The dates were cooled on screens to room temperature. The dates had a moisture content of 15.13 percent and an ERH of 60.0 percent.

The treated dated were hard and gritty, and were not good. This example shows the effects of microwave drying the sugar-coated dates after steaming, along with microwave drying instead of forced air drying.

The following examples deal with portions of the invention process or with other techniques which show that the results of the invention process are unobvious.

EXAMPLE 11

Whole domestic dates were conditioned in an open tray at 100° F. and 90 percent relative humidity. The Agtron reading dropped from an initial value of 32 to a value of 27 after 96 hours of conditioning, which means that only a slight color change occurred. The dates were moldy after 120 hours.

EXAMPLE 12

Domestic whole dates were subjected to forced air heating at 200° F. in a closed receptacle to ascertain the effect thereof on the color of the dates. As a reference point, the Agtron reading for imported dates (having a reddish-brown appearance) is 29. For the domestic dates, the Agtron reading dropped from an initial value of 39.5 to a value of 15 after 7 hours of heat treatment. The result was a good darkened color for the domestic dates after 6 to 7 hours of exposure.

The subject darkness analysis of the domestic dates went from an initial value of less than 0.1 to a value of 5 after 6 to 7 hours of exposure.

EXAMPLE 13

Domestic dates were soaked in 0.1 N NaOH for 15 minutes and were then subjected to heating in a forced air oven (closed) at an air temperature of 200° F. to ascertain if alkaline treatment had any effect on the color of the dates. For the NaOH-soaked domestic dates, the Agtron reading dropped from an initial value of 37 to a value of 14 after 7 hours of heat treatment. A comparison of such values with the values for the domestic dates treated in Example 12 shows that the color reaction of domestic dates when subjected to forced air heating is apparently not alkaline-pH dependent.

EXAMPLE 14

Domestic dates having a water activity greater than 0.68 were force air dried at 100° F. for 18 to 24 hours to provide a water activity therefor of less than 0.68. Such treated domestic dates were shelf stable.

Using a dielectric oven conditioning treatment, domestic dates having a water activity of greater than 0.68 were passed through a 12 Kilowatt Strayfield Dielectric oven 5 times at a conveyor belt speed of 1.5 minutes and a setting of (-) 95. The treated domestic dates had a water activity of less than 0.68 and were shelf stable.

EXAMPLE 15

Pitted domestic dates were steamed under atmospheric conditions for approximately 1 hour, during which time a desirable color developed. The pitted domestic dates had been preconditioned in a dielectric oven before the subsequent exposure to steam heat. The steam injection acclerated the color development of the dates. Such process achieved an attractive, comparably-colored domestic date when compared to the imported date.

The steam-treated domestic dates and imported dates were prepared in a date bran muffin recipe. Twenty-four taste test panelists were given written instructions that they were to evaluate the effect of the dates in the muffins. The panel was asked to evaluate appearance, flavor, texture and overall categories in a blind test. Each panelist was given ½ of a muffin having the imported dates and ½ of a muffin having the steam-treated domestic dates. There was no significant preference in the flavor, texture and overall categories, but the panel significantly preferred the appearance of the steam-treated domestic dates in muffins over the imported dates in muffins. The steam-treated domestic dates were well received by the taste panel when prepared in a date bran muffin recipe.

Treatment of pitted domestic dates with pressurized steam reduced the color development time by about 67 percent.

EXAMPLE 16

Domestic dates were pierced with a fork to offer additional entry channels, beside the pit void for absorption treatments. A solution of blue dye was used to determine the degree of color penetration over a period of time. It took approximately 12 to 17 hours for significant visual penetration. Using caramel color solutions the procedure was repeated. However, the brown color intensity was not of sufficient strength to darken the date interior and did not penetrate the date rag, that is, the white fibrous tissue that immediately lines the area of the pit.

EXAMPLE 17

Domestic dates were pierced with a fork and then soaked for 15 minutes at 100° F. under vacuum (30"P) in a solution containing 5 percent of Firmenich's Natural Brown Flavor (a brown sugar flavor) and the remainder fructose corn syrup. Under the vacuum, there was initially foaming and bubbling at the surface of the solution and then the foam began settling. The soaked dates were drained, placed in a box and retorted (no pressure) under steam only for 1 hour. The dates in an open box were dried in a forced air oven at 240° F. for 1 hour. The procedure was then repeated on more domestic dates using H & R Brown Sugar flavor. The domestic dates treated with the H & R Brown Sugar flavor were sweeter, more pleasant tasting and the domestic dates a more characteristic date flavor. The domestic dates treated with Firmenich's Natural Brown Flavor had more of a pruny sour taste.

EXAMPLE 18

Pierced domestic dates were soaked in pure honey (137 percent weight of the dates) under vacuum at 100° F. for 15 minutes. The dates were drained and weighed, whereby it was found that the dates absorbed honey in the amount of 20 percent by weight of the dates. The dates were placed on plates and microwaved for 3 ½ minutes. The dates were then steamed (in retort, door open, about 10 lbs pressure, exhaust valves closed) at about 250° F. for 1 hour. The dates were again microwaved on plates for 2 ½ minutes and then cooled on a screen at room temperature. The dried dates had an ERH of 63.5 percent and were sticky, soft and very sweet. Date bran muffins using the dates received an excellent reception from a taste panel. The taste panel did not find any significant quality difference in preference when such treated domestic dates were compared to imported dates.

Other pierced domestic dates were soaked in pure honey as above. The soaked dates were drained. The dates were dried and darkened on a screen for 1 hour at 240° F. in a forced air oven. The dried dates had an ERH of 67.6 percent. The dried dates got very hard and did not darken sufficiently.

Still other pierced dates were soaked in pure honey as above. The soaked dates were drained. The dates were microwaved on plates for 3 ½ minutes and then were steamed (in retort) for 1 hour as above. The dates in an open box were dried in a forced air oven at 240° F. After 30 minutes of drying, the dates were slightly hard and crisp; after 40 minutes, the dates were slightly hard and crisp (more so than at 30 minutes); after 45 minutes, the dates were crisp and slightly too hard; and after 60 minutes, the dates were very hard (too much so) and crisp.

EXAMPLE 19

Pierced domestic dates were dipped (under vacuum) in high fructose corn syrup (invert syrup). A box of the dipped domestic dates were steamed for 45 minutes (autoclave door closed, relief valve closed). The wet heating produced dates having a very dark black-brown color with a touch of red, but the skin was peeling off. A box of the dipped domestic dates were dried on a screen at 240° F. in a forced air oven for 20 minutes. The dry heating produced dates having a dark brown color with a touch of red and having a pleasantly sweet flavor. Such dates were rather moist inside and were still more fibrous than imported dates.

Other pierced domestic dates were dipped as above in high fructose corn syrup (HFCS). A jar full of the dipped domestic dates were dried in a forced air oven at 240° F. for three hours (concerning the moisture in the jar). The syrup drained off of the dates and settled in the bottom of the jar. The dates were wet and mushy and appeared to be falling apart. The dates were sufficiently dark, but appeared to darken at a slightly faster rate than those in the procedure immediately below.

Still other domestic dates were dipped as above in high fructose corn syrup. A box of the dipped domestic dates was heated in a forced air oven at 240° F. for 3 hours (there was moisture loss through the box). A box of whole domestic dates, which had not been dipped in the syrup, was heated in a forced air oven at 240° F. for 3 hours. The untreated dates in the box wrinkled and slowly darkened. The dipped dates had smooth, shiny surfaces and were less wrinkled than the untreated dates. The dipped dates darkened more and slightly faster than the untreated dates. But after three hours of drying, there was not any significant darkening of the untreated dates or the dipped dates.

It appears that moisture and moist heat help to greatly speed up the rate of darkening of domestic dates. The dates in the jars treated at 240° F. in the forced air oven darkened sufficiently in 3 hours—the jars retained the moisture. The steam treatment (moist heat) succeeded in darkening the dates in an hour or slightly less. The dates with increased moisture, due to HFCS absorption, darkened sufficiently with moist heat in 45 minutes. The dates in the boxes treated at 240° F. in the forced forced air oven did not darken in 3 hours, while those in the jars did darken. Moisture was lost through the boxes but was retained by the jars. The dates with HFCS in the boxes treated at 240° F. in the forced air oven darken slightly more than the untreated dates in the boxes. This is so probably because the domestic dates soaked in HFCS were slightly higher in moisture content.

EXAMPLE 20

This example determined the degree of penetration of liquids into whole dates by using blue food coloring to visually detect penetration and the used HCl to determine if anthocyanins were present in dates (i.e., would turn reddish in an acid medium).

Two sets of three groups of domestic dates were soaked in 0.1 N, 0.5 N and 1N HCl, respectively, for 15 minutes. One set of dates was steamed over a steam bath at 150° F. for 20 minutes. Both sets of dates were drained and 10 grams of each group of dates was mixed with water. The pH of the solution of the dates soaked in 0.1 N HCl was 4.60 and of the dates soaked in 1.0 N HCl was 2.24. All of the dates became soft and mushy with a breakdown of skin integrity. The inside of the dates had a whitish appearance. As time went on, a pinkish color developed from the edges and spread through the dates. It began to appear at about 10 minutes. As the normality of the solution increased, a darkness and speed of pink appearance increased.

Domestic dates were soaked in a solution of 100 ml of water and 3 drops of blue food coloring. The degree of penetration was determined of a 0 to 5 scale, with 0 meaning no penetration and 5 meaning maximum penetration (absorption). The degree of penetration was 4.0 in 2 ½ hours, 4.5 in 3 ½ hours and 5.0 in 17 hours.

Domestic dates were soaked at 100° F. under vacuum (30"P) in a solution of 200 ml of high fructose corn syrup and 3 drops of blue food coloring. The degree of penetration was 2.5 in 30 minutes, 3.0 in 16 ½ hours (without the vacuum) and 3.5 in 21½ hours.

Domestic dates were punctured, soaked at atmospheric pressure in a solution of 200 ml of high fructose corn syrup and 3 drops of blue food coloring and rinsed with water. The degree of penetration was 2.5 in 75 minutes, 3.0 in 90 minutes, 3.5 in 105 minutes and 3.5 in 180 minutes. The blue food coloring did not alter the brown color. However, the brown seemed somewhat darker and, more importantly, the dates got consistently heavier as the solution seemed to become absorbed into the tissues. The dates seemed to be very saturated with the solution. When the dates were rinsed with water, the blue color washed away, but part of the white inner tissues was a dark bluish-brownish (not white). The brown tissues seemed to be darker. When the dates were squeezed (after rinsing), a bluish-greenish fluid seeped out.

Domestic dates were punctured, soaked for 20 minutes in a pot while heating on a stove in a solution of 200 ml of high fructose corn syrup and 3 drops of blue food coloring and rinsed with water. 10 minutes of the heating produced dates that were slightly darker, were blue in the center and had slight absorption in the tissues. 20 minutes of heating turned the dates black on the inside and outside. The dates were soft, moist and mushy. The carmelization of the sugars could be smelled.

The blue food coloring and its medium (water or HFCS) was absorbed into the dates and, perhaps, the vacuum treatment aided in speeding up the absorption process. In all of the treatments, the dates seemed to be heavier due to the weight of the liquid they absorbed. From the HCl soak and the resulting pink development, it seems that dates contain anthocyanins that help give the dates their characteristic color.

EXAMPLE 21

Various sets of domestic dates were heated at various temperatures. A relationship of heating time at various temperatures on the development of the desired color in domestic dates was observed. As the temperature increased, the time for color development decreased. Based on this established relationship, it appears that there is a direct relationship between color development and temperature-time conditions.

EXAMPLE 22

The following table sets out the sugar analysis of various treated and untreated Deglet Noor dates:

| CONDITION OF THE DATES | TOTAL SUGAR PERCENT | SUCROSE, PERCENT | REDUCING SUGAR PERCENT | REDUCING SUGAR ON TOTAL SUGAR BASIS, PERCENT |
|---|---|---|---|---|
| Untreated | 65.0 | 30.0 | 35.0 | 54 |
| Mascerated, Control | 65.5 | 23.5 | 42.0 | 64 |
| Mascerated, Enzyme[1] | 65.0 | 6.5 | 58.5 | 90 |
| Whole, Control | 67.0 | 20.5 | 46.5 | 69 |
| Whole, Enzyme[2] | 67.0 | 10.0 | 57.0 | 85 |
| Imported dates | 70.0 | — | 70.0 | 100 |

Notes:
[1] 1 percent invertase added directly.
[2] 4 percent invertase solution, vacuum oven infusion method.

The enzymatic treatment of domestic dates, using the enzyme Invertase, which converts sucrose, the primary sugar of domestic dates into glucose and fructose sugar molecules (invert sugar), the primary sugar of imported dates, was investigated. Invert sugar contributes to the flavor, and favorably affects the shelf stability, textural mouthfeel, and color development of the dates.

Mascerated dates were expressly used for the purpose of obtaining a uniform enzyme distribution in the samples as a control against which the unknown variables of enzyme solution strength and absorption of the solution in whole pitted dates could be measured. Data in the mascerated date control contained 90 percent of reducing sugar after enzyme treatment and the whole pitted date had an 85 percent reducing sugar level. Flavors of these products were judged markedly sweeter in taste than the untreated domestic dates. The enzyme treatment darkened the domestic dates.

The distinct product identity of imported dates is their darker appearance (color). The invention method darkens the appearance of the domestic date not only on the surface but throughout the date. Furthermore, the invention conversion process achieves a softer, more pliable texture which closely resembles the texture of imported dates. The flavor of the invention-treated dates is excellent. Equality in the acceptance of the converted domestic date of the invention versus the imported date has been shown by paired preference tests performed by a laboratory taste panel on the dates, as is by themselves, as well as, in baked applications, i.e., date bran muffins and date-nut bars.

What is claimed is:

1. Process for treating light-colored, sucrose-type dates grown domestically to impart thereto the darker appearance, the flavor, the soft-chewy texture and the shelf-stability of imported invert sugar-type dates grown in the Middle East region comprising:
   (a) applying to the domestic dates a coating of a liquefied composition containing water and an effective amount of at least one saccharide sugar sweetening agent;
   (b) steaming the domestic dates containing the liquefied coating at a temperature and for a period of time which are sufficient to darken the coated domestic dates to substantially the same darkness as that of imported dates; and
   (c) drying the steamed, coated domestic dates to provide shelf-stable, non-expanded treated dates, the size and shape of the shelf-stable, treated dates being substantially the same as the size and shape of the starting domestic dates, and said process not including any step or steps wherein there is expansion of the dates being treated from the original size of the untreated dates.

2. Process as claimed in claim 1 wherein coating (a) is applied to the domestic dates by spray coating liquefied composition (a) onto the domestic dates.

3. Process as claimed in claim 2 wherein liquefied composition (a) is hot when it is sprayed.

4. Process as claimed in claim 1 wherein the domestic dates are of the Deglet Noor variety.

5. Process as claimed in claim 1 wherein the saccharide sugar sweetening agent is a disaccharide sugar sweetening agent and liquefied composition (a) has 65 to 85 weight percent of the disaccharide sugar sweetening agent.

6. Process as claimed in claim 1 wherein the saccharide sugar sweetening agent is sucrose, and liquefied composition (a) is composed of water and 60 to 95 weight percent of sucrose.

7. Process as claimed in claim 6 wherein about 75 weight percent sucrose is present in liquefied composition (a).

8. Process as claimed in claim 1 wherein liquefied composition (a) is selected from the group consisting of (i) an aqueous solution of sucrose, (ii) an aqueous solution of fructose, (iii) an aqueous solution of lactose, (iv) an aqueous solution of dextrose, (v) an aqueous solution of invert sugar, (vi) maple sugar, (vii) molasses, (viii) an aqueous solution of brown sugar, (ix) honey, (x) an aqueous solution of corn syrup, and (xi) mixtures of materials (i) to (x).

9. Process as claimed in claim 8 wherein the aqueous solution of corn syrup is an aqueous solution of high fructose corn syrup.

10. Process as claimed in claim 1 wherein liquefied composition (a) contains 1 to 10 weight percent of at least one flavoring agent.

11. Process as claimed in claim 1 wherein steaming step (b) is conducted by using steam having super atmospheric pressure.

12. Process as claimed in claim 1 wherein steaming step (b) is conducted by using steam having atmospheric pressure.

13. Process as claimed in claim 1 wherein drying step (c) is conducted by using a temperature of 220° to 260° F.

* * * * *